United States Patent [19]

Shyu

[11] Patent Number: 5,196,388
[45] Date of Patent: Mar. 23, 1993

[54] PROCESS FOR THE PREPARATION OF DOUBLE METAL OXIDE POWDERS CONTAINING A GROUP IIIA AND A GROUP IVB ELEMENT AND A NOVEL DOUBLE METAL HYDROXYL CARBOXYLATE USEFUL IN PREPARING SAME

[75] Inventor: Lieh-Jiun Shyu, Yorktown Heights, N.Y.

[73] Assignee: Akzo N.V., Arnhem, Netherlands

[21] Appl. No.: 713,195

[22] Filed: Jun. 10, 1991

[51] Int. Cl.$^5$ .............................................. C04B 35/46
[52] U.S. Cl. .................................... 501/134; 423/593; 423/598; 423/600; 501/153
[58] Field of Search ................... 423/593, 598, 600; 501/126, 127, 136, 139, 153, 134

[56]  References Cited

U.S. PATENT DOCUMENTS

| | | | |
|---|---|---|---|
| 3,825,653 | 7/1964 | Duerkson et al. | 423/598 |
| 4,266,978 | 5/1981 | Prochazka | 423/593 |
| 4,661,282 | 4/1987 | Clark | 423/593 |
| 4,946,810 | 8/1991 | Heistand, II et al. | 423/598 |
| 5,039,636 | 8/1991 | Lukacs, III | 501/153 |
| 5,849,371 | 9/1991 | Rinn et al. | 501/153 |

FOREIGN PATENT DOCUMENTS

| | | |
|---|---|---|
| 275343 | 7/1988 | European Pat. Off. |
| 1-92723 | 8/1989 | Japan |
| 1-294526 | 11/1989 | Japan |
| 1-294527 | 11/1989 | Japan |
| 1-294528 | 11/1989 | Japan |
| 1-294529 | 11/1989 | Japan |

OTHER PUBLICATIONS

P. A. Brugger et al., Journal of Materials Science 21 (1986( 4431–4435.

*Primary Examiner*—William R. Dixon, Jr.
*Assistant Examiner*—Paul Marcantoni
*Attorney, Agent, or Firm*—Richard P. Fennelly; Louis A. Morris

[57]  ABSTRACT

Disclosed is a process for the preparation of double metal oxide ceramic powders which contain at least one metal of Group IIIA, inclusive of aluminum and gallium, and at least one metal of Group IVB, inclusive of titanium and zirconium. The process involves a first step in which an aqueous solution of mixed metal alkoxides or salts is formed and which also contains a chelating agent, preferably a polycarboxylic acid, and a second step in which a base is added in order to cause precipitation of a mixed metal hydroxyl groups-containing precursor that can be calcined or otherwise converted to the final mixed metal oxide. The invention also pertains to novel double metal hydroxyl carboxylates which are useful intermediates in preparing double metal oxides.

20 Claims, No Drawings

PROCESS FOR THE PREPARATION OF DOUBLE METAL OXIDE POWDERS CONTAINING A GROUP IIIA AND A GROUP IVB ELEMENT AND A NOVEL DOUBLE METAL HYDROXYL CARBOXYLATE USEFUL IN PREPARING SAME

BACKGROUND OF THE INVENTION

The invention generally pertains to a process for the preparation of double metal oxide ceramic powders which contain at least one metal of Group IIIA, inclusive of aluminum and gallium, and at least one metal of Group IVB, inclusive of titanium and zirconium, which process involves the formation of a mixed metal precursor that is subsequently calcined, or otherwise converted, into the desired oxide. In particular the invention pertains to the preparation of aluminum titanate. The invention also pertains to a mixed metal precursor useful in the preparation of said double metal oxides.

Double metal oxide powders are known ceramic compounds, which find usage, e.g., as abrasives or as thermal insulators. Aluminum titanate, $Al_2TiO_5$, in particular, is a hard abrasive and is known to have a low thermal expansion and hence a high thermal shock resistance.

Processes for the preparation of double metal oxides of the type indicated above which involve the formation of a mixed metal precursor are known in the art.

One such process has been disclosed in the Journal of Materials Science 21 (1986) 4431–4435. It involves controlled hydrolysis of organometallic precursors such as aluminum and titanium alkoxides dissolved in an alcoholic medium. A significant drawback to this so-called sol-gel process is the criticality of the rate of hydrolysis. In order to obtain a product with the desired ratio of both metals the relative hydrolysis rates of both alkoxides need be carefully adjusted by, e.g., varying the nature of the alkoxide substituent and/or varying the reaction temperature. In commercial practice it is desired that the metal ratio in the mixed metal oxide be adjusted in a more simple and straightforward manner. A further drawback to the sol-gel process is the need to use alkoxides. For economical reasons a process is desired in which metal salts are applicable as well, since these are generally cheaper. Still another drawback to double metal precursors of the alkoxide type is their flammability and the heat evolved in the exothermic decomposition reaction, which renders these compounds hazardous in preparing the desired double metal oxides.

A process of the type referred to above in which the use of metal salts is contemplated has been disclosed in U.S. Pat. No. 3,825,653. According to the disclosure of this patent, sinterable aluminum titanate powder is prepared by coprecipitating alkoxide or halide compounds of aluminum and titanium as a hydroxide. The process comprises the steps of forming a solution of an aluminum compound in the +3 valence state and a titanium compound in the +4 valence state, coprecipitating the aluminum and the titanium from the solution as aluminum titanium hydroxide, filtering and drying the precipitate, and thereafter calcining the mixed metal hydroxide precursor to form aluminum titanate powder. In the embodiment where metal alkoxide compounds are used, the solvent should be a hydrocarbon liquid, preferably benzene. In another embodiment water-soluble metal salts are used, which after mixing should be rapidly added to an aqueous solution containing a hydroxide. Both alternative embodiments display significant drawbacks. Besides the above-mentioned disadvantages of using alkoxides, the alkoxide embodiment disclosed in U.S. Pat. No. 3,825,653 displays a further drawback in that organic solvents are required which for environmental and health reasons should be avoided. In this respect as well as with regard to the above-mentioned economical reasons the water-soluble salt embodiment is to be preferred. However, this has proven to be unsuitable for any commercial-scale use, since the critical step of mixing the two metal salt solutions and adding the mixed solution to the aqueous hydroxide solution unavoidably leads to uneven precipitation. Uneven precipitation means the undesirable result that one of the metal compounds precipitates preferentially, or even that a single metal precipitate is formed. Hence, said known process is insufficiently controllable to be feasible in commercial-scale use.

The present invention has for one of its objects to provide a process for the preparation of mixed metal oxides as indicated above that avoids the use of hydrocarbon solvents, even if organometallic starting materials are used. A further object of the present invention is to prevent uneven precipitation, even if mixed aqueous metal salt solutions are used. Still another object of the present invention is to provide a process of the above-identified type in which the metal ratio in the resulting mixed metal oxides can be adjusted simply by adjusting the ratio of the starting compounds. A further object of the invention is to provide a double metal precursor that can be used with advantage in preparing double metal oxides, and which avoids explosion hazards.

These and other objectives are met by the process and product as described in the following summary and detailed description of the invention.

SUMMARY OF THE INVENTION

A process for the preparation of double metal oxide ceramic powders which contain at least one metal of Group IIIA, inclusive of aluminum and gallium, and at least one metal of Group IVB, inclusive of titanium and zirconium, comprising the steps of (a) forming a mixed aqueous solution of compounds which contain said metals and which are selected from the Group consisting of metal salts, metal alkoxides, and mixtures thereof, the solution also containing a polyfunctional, preferably polycarboxylic compound capable of chelating the metal compounds;

(b) adding an effective amount of a base to the solution formed under (a) in order to form a homogeneous double metal precipitate; and (c) converting the precipitate formed under (b) into a double metal oxide.

The instant invention also pertains to hydroxyl groups-containing double-metal compounds obtainable by the above process steps (a) and (b) and which can be utilized as intermediates in the preparation of the instant useful double metal oxides.

It is essentially the combination of steps (a) and (b) which serves to obviate the art-recognized drawbacks associated with the preparation of double metal oxides of the instant type. As one advantage it can be mentioned that said combination of process steps is a key to avoiding organic solvents, even when metal alkoxides are used as a starting material for the preparation of the subject double metal oxides. As another advantage, it can be mentioned that by virtue of said process steps metal salts can be used as starting materials in a controlled manner, which results in practically feasible, economic manufacture. A further advantageous aspect of the instant combination of process steps is the possibility to adjust the metal ratio in the final double metal oxide simply by adjusting the metal ratio in the starting materials. Also, the precipitate resulting after step (b) is of a type surprisingly suitable to be further converted, e.g. by calcination, into the desired double metal oxides. The conversion may be carried through employing any known technique, but the precipitated intermediate of the instant invention allows for the most gentle and economically advantageous conditions. As a further advantage the instant double metal precipitates do not contain the alkoxide groups which are responsible for the flammability that renders known precursors hazardous in the decomposition reaction of step (c).

Further aspects of the invention and its preferred embodiments will be apparent from the detailed description that follows.

DETAILED DESCRIPTION OF THE INVENTION

The starting materials in the process of the present invention are at least one compound containing a metal of Group IIIA of the Periodic Table and at least one compound containing a metal of Group IVB. Preferred metals of Group IIIA are aluminum and gallium, with the highest preference being given to aluminum. Preferred metals of Group IVB are titanium and zirconium, the former having the highest preference. As indicated above, the metal containing compounds are either metal alkoxides or metal salts. It is possible to employ either two alkoxides or two salts, or to employ an alkoxide of one type metal and a salt of the other. It is preferred to use a salt of the Group IIIA metal and an alkoxide of the Group IVB metal. Suitable metal alkoxides include compounds derived from either monohydric or polyhydric aromatic, aliphatic or alicyclic alcohols. Preferred alkoxides are of the aliphatic or alicyclic type, derived from, for example, methanol, ethanol, n-propanol, iso-propanol, n-butanol, sec-butanol, iso-butanol, pentanol and isomers thereof, hexanol and isomers thereof, cyclopentanol, and cyclohexanol. By further preference, the alkoxide is derived from a lower aliphatic branched alcohol, such as iso-propanol, sec-butanol, or iso-butanol. Suitable metal salts include carboxylic acid salts as well as inorganic salts. Preferred carboxylic acid salts include those derived from lower carboxylic acids such as, e.g., formic acid, acetic acid, propionic acid, butanoic acid. Preferred salts are of the inorganic type, e.g. sulfates, sulfites, halides, nitrates, nitrites, phosphates, phosphites, etc. Preferred inorganic salts are sulfates.

The metal compounds can generally be present in a mole ratio of Group IIIA:IVB of from about 1:1 to about 25:1. Preferably the ratio is about 2:1.

Essential to the instant invention is the use of a polyfunctional compound capable of chelating the metal compounds. Chelating agents are well-known in the art and are generally described as a compound containing donor atoms that can combine by coordinate bonding with a single metal atom to form a cyclic structured complex called a chelate. The term "polyfunctional" is used to indicate difunctional as well as higher functional compounds. Suitable functional groups are, in particular, hydroxyl and carboxyl. The polyfunctional chelating agents may also have mixed functional groups. The term "carboxylic functional group" is used to indicate carboxylic acids and functional derivatives thereof. Such derivatives are well-known to the man skilled in the art and include carboxylic esters, carbonyl chlorides, and carboxylic anhydrides. The polyfunctional chelating compound preferably is a polycarboxylic compound, since the resulting absence of ether groups renders the double metal precipitates even more explosion resistant than already was achieved by virtue of the absence of alkoxy groups. The polycarboxylic compound preferably is a polycarboxylic acid. The highest preference is given to dicarboxylic acids. Examples of suitable chelating agents are, e.g., mixed higher functional compounds such as citric acid, mixed difunctional compounds such as glycolic acid, dihydroxy functional compounds such as ortho dihydroxy benzene (catechol), higher functional polycarboxylic acids such as ethylene diamine tetraacetic acid (EDTA), and difunctional carboxylic acids such as oxalic acid, malonic acid, malic acid, adipic acid, tartaric acid, succinic acid, and glutaric acid, among others. The preferred chelating agent is oxalic acid.

In the process according to the present invention the solubilizing effect of a chelating agent is advantageously used to keep the metal-containing compounds in solution. Though in general it is known to use chelating agents for solubilizing compounds not normally soluble in a medium, it should be noted that the effects of the chelating agent found in accordance with the present invention were not to be expected. So, the use of a chelating agent in conjunction with the instant Group IIIA and Group IVB metal compounds provides a solubilized mixed metal complex that allows for homogeneous precipitation of a double metal precursor in which the ratio of both types of metals reflects the metal ratio in the mixture of starting materials. It is surprising that the current combination of metals, which is made in view of the favorable properties of the resulting calcined products, also is a combination which allows for the advantageous process steps (a) and (b). This becomes the more apparent in view of prior art related to the use of a dicarboxylic acid, viz. oxalic acid, in the preparation of mixed metal oxides.

So, published Japanese Patent Applications Laid-Open Nos. 01/294526, 01/294528, and 01/294529 teach a process for the production of a double metal oxide which involves mixing two metal-containing solutions, one containing calcium, barium or strontium ions, the other containing titanium or zirconium ions. It is disclosed that after mixing the solutions the addition of oxalic acid causes precipitation.

Further, Group IIIA polycarboxylate, notably aluminum oxalate, is known to have a low aqueous solubility. Hence, the person of ordinary skill in the art knowing that mixing solutions containing Group IIIA and Group IVB metals leads to uneven precipitation would expect oxalic acid to worsen the process rather than improving it.

Step (a) may be carried through by preparing two separate solutions, each containing one type of metal, adding the chelating agent to one of the solutions, and subsequently mixing the solutions. If water-soluble salts are used it is not critical to which of the mono metal solutions the chelating agent is added. It is preferred to prepare a solution of the chelating agent and then add the metal compounds, in either order.

The amount of polycarboxylic acid should be effective to maintain the mixed metal compounds in solution.

In general the amount will be related to the amount of metal-containing compounds in a mole ratio of total metal to chelating agent (calculated as if difunctional) of about 1:3, preferably about 1:1.5. As the person of ordinary skill in the art will understand, the precise amount to be used depends on number and type of functional groups in the chelating agent, as well as on the specific metals used. Without undue experimentation the preferred amount can be determined by monitoring whether precipitation takes place. Excess chelating agent does not negatively impart the results obtained with the process according to the present invention.

Step (b) involves the addition of a base in an effective amount to effect precipitation of the previously mentioned double metal hydroxyl carboxylate. The amount to be used depends on the strength of the base, the specific types of metal compounds and the chelating agent used. In practice the effective amount can be determined simply by slowly adding base to the solution formed in step (a) and monitoring the pH of the solution, which will display a rise when precipitation is complete. Since the amount of base is not critical one can also add excess base, either slowly, stepwise, or in one shot.

In the process of this invention any base capable of generating hydroxide ions when being contacted with water is suitable. These Bronstedt bases are well-known in the art and need no further elucidation here. Both organic and inorganic bases are suitable. Suitable organic bases include urea, and organic amines such as ethyl amine and dimethyl amine, among others. Suitable inorganic bases include alkali metal hydroxide, alkali earth metal hydroxide or ammonium hydroxide, among others. The highest preference is given to ammonium hydroxide, since by virtue of the volatility of $NH_3$ gas the double metal precipitate hardly needs any purification step. Otherwise, washing and drying cycles are commonly used to purify the reaction product and to prevent incorporation of undesired metal ions in the instant double metal oxides.

As indicated above, the invention also pertains to novel hydroxyl group-containing double metal compounds obtainable by a process involving the steps (a) and (b) described hereinbefore. These compounds can be described in general by the following molecular formula:

$$(A)_x(B)_y(OH)_p(FG)_q$$

in which
A represents a Group IIIA metal;
B represents a Group IVB metal;
FG represents a functional group that is part of the chelating agent;
x, y, p, and q each independently represent an integer greater than 1 with the proviso that
x:y is in the range of from about 1 to about 25, and
p+q equals 6x+4y.

Subject compound may be oligomeric, i.e. x is in the range of several tens to several hundreds, but more likely will be polymeric, i.e. x is in the range of several hundreds to several thousands.

By preference, the groups indicated by FG are carboxyl groups. By further preference the chelating agent is a dicarboxylic compound. The preferred ratio x/y is 2. Hence, preferred double metal hydroxyl carboxylates in accordance with the instant invention satisfy the general structural formula

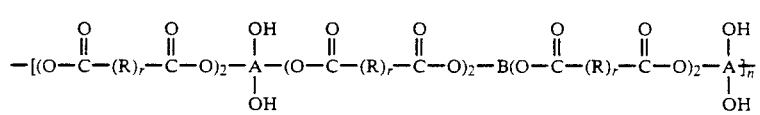

in which
A represents a Group IIIA metal;
B represents a Group IVB metal;
n represents an integer greater than 1
R represents an organic radical
r is 0 or 1.

It should be noted that the above structural formula is believed to be the best representation of subject compounds found, but should not be considered to be binding or limitative. Essentially, the instant compounds are those obtainable by a process involving the steps (a) and (b) described hereinbefore. These compounds at least are dimeric (n=2), but more probably will be oligomeric (n is in the range of several tens to several hundreds) or even more probably polymeric (n is in the range of several hundreds to several thousands).

The preferred double metal compound, which results from using oxalic acid as the chelating agent and which involves aluminum and titanium as the Group IIIA and Group IVB metals is aluminum-titanium hydroxyl oxalate, which is believed to be best represented by the following structural formula:

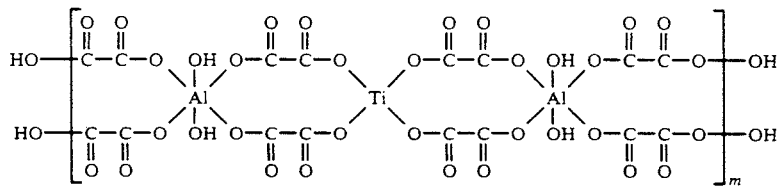

in which m represents an integer greater than 1.

The integer m will generally be in the range of several hundreds to several thousands. The product, aluminum titanium hydroxyl oxalate, essentially is the product obtainable by the process steps (a) and (b) described hereinbefore if the respective metal compounds used are titanium and aluminum compounds and the chelating agent is oxalic acid.

The above double metal compounds are used in the preparation of double metal oxides in accordance with step (c) of the process described hereinbefore. Step (c) preferably involves calcination. Calcination is a treatment well-known in the art, and can be described as heating of a solid to a temperature which is below its melting point but which is sufficiently high to bring about a state of thermal decomposition or a phase transition other than melting. In the present preparation of a double metal oxide the instant double metal precursor is heated to such an extent that it decomposes to the desired double metal oxide. Step (c) in accordance with the present invention generally involves heating from room temperature to a temperature in the range of from 1000° to 1500° C. at atmospheric pressure. The duration of the heat-treatment depends on the amount of material used. A suitable period is, e.g., 2 to 20 hours for about 50 g of precursor material. The manner in which step (c) is performed is not critical to the present invention, i.e. decomposition of said precursors to the desired oxides can be effected by any other feasible means.

In addition to the already indicated advantages to the process of the present invention the above-described double metal compounds, and in particular the instant double metal hydroxyl carboxylates, can more favorably be utilized as precursors in the preparation of double metal oxides than the precursors known in the art. Said known precursors are either solid mixtures of aluminum oxide and titanium oxide, or—if the sol-gel process referred to above is used—alkoxide groups containing double metal compounds. The first-mentioned prior art precursors have to be brought into a solid state reaction to effect conversion to the desired double metal oxides. To effect such a reaction a higher temperature is required than with the conversion of precursors which, in accordance with the instant invention, already contain both desired metals. Hence, the invention precursors lead to a more economical preparation of double metal oxides. The latter prior art precursors can, theoretically, be employed in a reaction in accordance with step (c) above. However, since said alkoxy and ether groups-containing precursors are highly flammable and potentially explosive, these prior art precursors are hazardous in a calcination process. The invention precursors can be employed in a reaction according to step (c) described hereinbefore, which can be carried out at lower temperatures than a solid state reaction of two separate metal oxides, and in the conversion to double metal oxides are far less hazardous than the known alkoxide and ether groups-containing double metal compounds.

The invention will be further illustrated hereinafter with reference to the Examples. The following Examples should be construed to be explanatory rather than limitative.

EXAMPLE 1

Pure aluminum titanate was prepared by a process in accordance with the present invention as follows:

Step (a): Into a 1 liter reactor 44.12 g of oxalic acid dihydrate was added to 187.4 g of water. The mixture was heated by a heating mantle, and mechanically stirred until all solids had dissolved. To this clear solution was added 66.64 g of aluminum sulfate octadecahydrate; the mixture was stirred until all solids had dissolved, and the resulting solution was subsequently cooled to room temperature. Under nitrogen, 28.4 g of titanium isopropoxide was added dropwise, in first instance forming a precipitate which upon stirring was solubilized immediately.

Step (b) A 30% aqueous ammonium hydroxide solution was added and precipitation occurred immediately. The precipitate formed under (b) was separated from the aqueous phase by filtration, washed thoroughly with water and subsequently dried at 100° C. overnight. The dried solid was crushed gently in a sieve and passed through a 140 mesh screen to obtain 56 g of aluminum titanium hydroxyl oxalate.

Step (c) The <140 mesh powder obtained under (b) was calcined by subjecting it to heat for 5 subsequent periods of 2 hours each, at temperatures of 200° C., 400° C., 800° C., 1100° C., and 1500° C.

EXAMPLE 2

As Example 1, except that instead of titanium isopropoxide 19.0 g of titanium chloride was used. It was observed that upon contacting titanium chloride with the aqueous solution smoke was generated, which however could be allowed to settle and be solubilized.

EXAMPLE 3

As Example 1, except that instead of titanium isopropoxide 34.04 g of titanium n-butoxide was used.

EXAMPLE 4

As Example 1, except that instead of oxalic acid 49.03 g of citric acid monohydrate was used and instead of ammonium hydroxide sodium hydroxide was used.

EXAMPLE 5 (Comparative)

It was attempted to prepare aluminum titanate by a process not in accordance with the present invention, in which no chelating agent was employed.

Step (a): To 187.4 g of water 66.64 g of aluminum sulfate was added and dissolved under heating and stirring. Under nitrogen 28.4 g of titanium isopropoxide was added dropwise. Immediately a precipitate was formed that could not be solubilized, neither by stirring, nor by the addition of an acid, viz. nitric acid. The precipitate turned out to be titanium hydroxide.

Step (b): Ammonium hydroxide was added, to result in a separate aluminum hydroxide precipitate.

Step (c): No attempts were made to calcine the physical mixture of aluminum and titanium hydroxide obtained under (b).

EXAMPLE 6 (Comparative)

As Example 1, except that instead of the polyfunctional chelating agent acetic acid was employed. As in Example 5, titanium hydroxide precipitated immediately upon addition of titanium isopropoxide and could not be solubilized.

What is claimed is:

1. A process for the preparation of double metal oxide ceramic powders which contain at least one metal of Group IIIA and at least one metal of Group IVB comprising the steps of:
    (a) forming an aqueous solution of mixed metal compounds which respectively contain said Group IIIA and Group IVB metals and which compounds are selected from the group consisting of the metal salts, the metal alkoxides, and the mixtures thereof, the solution also containing a polyfunctional compound capable of chelating the metal compounds;
    (b) adding an effective amount of a base to the solution formed under (a) in order to form a homogeneous double metal precipitate; and,
    (c) converting the precipitate formed under (b) into a double metal oxide.

2. A process according to claim 1, wherein the polyfunctional compound capable of chelating said metal compounds is a polycarboxylic compound.

3. A process according to claim 2, wherein the polycarboxylic compound is a polycarboxylic acid.

4. A process according to claim 3, wherein the polycarboxylic acid is a dicarboxylic acid.

5. A process according to claim 4, wherein the dicarboxylic acid is selected from the group consisting of oxalic acid, malonic acid, adipic acid, malic acid, maleic acid, succinic acid, itaconic acid, citraconic acid, glutaric acid, and mixtures thereof.

6. A process according to claim 1, wherein the Group IIIA metal is aluminum and the Group IVB metal is titanium.

7. A process according to claim 6, wherein the polyfunctional compound capable of chelating said metal compounds is oxalic acid.

8. A process according to claim 7, wherein aluminum is used in the form of an inorganic acid salt and titanium is used in the form of an alkoxide.

9. A process according to claim 1, wherein the base is selected from the group consisting of sodium hydroxide, potassium hydroxide, ammonium hydroxide, magnesium hydroxide, calcium hydroxide, and mixtures thereof.

10. A process according to claim 3, wherein the base is selected from the group consisting of sodium hydroxide, potassium hydroxide, ammonium hydroxide, magnesium hydroxide, calcium hydroxide, and mixtures thereof.

11. A process according to claim 8, wherein the base is ammonium hydroxide.

12. A hydroxyl groups-containing double metal compound obtainable by a process involving the steps (a) and (b) as described in claim 1, in accordance with the general molecular formula $$(A)_x(B)_y(OH)_p(FG)_q$$

in which
 A represents a Group IIIA metal;
 B represents a Group IVB metal;
 FG represents a functional group that is part of the chelating agent;
 x,y,p, and q each independently represent an integer greater than 1 with the proviso that x:y is in the range of from about 1 to about 25, and $p+q$ equals $6x+4y$.

13. A double metal compound in accordance with the general structural formula $$-[(O-\overset{O}{\underset{\|}{C}}-(R)_r-\overset{O}{\underset{\|}{C}}-O)_2-\underset{\underset{OH}{|}}{\overset{\overset{OH}{|}}{A}}-(O-\overset{O}{\underset{\|}{C}}-(R)_r-\overset{O}{\underset{\|}{C}}-O)_2-B(O-\overset{O}{\underset{\|}{C}}-(R)_r-\overset{O}{\underset{\|}{C}}-O)_2-\underset{\underset{OH}{|}}{\overset{\overset{OH}{|}}{A}}]_n-$$

in which
 A represents a Group IIIA metal;
 B represents a Group IVB metal;
 n represents an integer greater than 1
 R represents an organic radical
 r is 0 or 1.

14. A double metal compound according to claim 13, wherein the organic radical is of the general formula $-(CH_2)_y-$ in which y represents an integer of from 0 to 6.

15. A double metal compound according to claim 12, wherein the Group IIIA metal is aluminum and the Group IVB metal is titanium.

16. Aluminum-titanium-hydroxyl-oxalate.

17. A process for the preparation of a double metal hydroxyl carboxylate containing at least one metal of Group IIIA, inclusive of aluminum and gallium, and at least one metal of Group IVB, inclusive of titanium and zirconium, comprising the steps of
 (a) forming a mixed aqueous solution of compounds which contain said metals and which are selected from the group consisting of metal salts, metal alkoxides, and mixtures thereof, the solution also containing a polycarboxylic compound capable of chelating the metal compounds; and,
 (b) adding an effective amount of a base to the solution formed under (a) in order to form a homogeneous double metal precipitate.

18. A method of using a double metal compound obtainable by a process in accordance with claim 17 to prepare a double metal oxide, comprising the step of subjecting said compound to sufficient heat to effect decomposition.

19. A method of using a double metal compound according to claim 12 to prepare a double metal oxide, comprising the step of subjecting said compound to sufficient heat to effect decomposition.

20. A method of using aluminum-titanium-hydroxyl oxalate to prepare aluminum titanate, comprising the step of heating the hydroxyl oxalate to a temperature of from 1000° C. to 1500° C. for a sufficient period of time to effect decomposition.

* * * * *